Feb. 6, 1968 R. L. SPRINGER 3,366,996
SAFETY BELT-FASTENING DEVICES
Filed Sept. 24, 1965 2 Sheets-Sheet 1
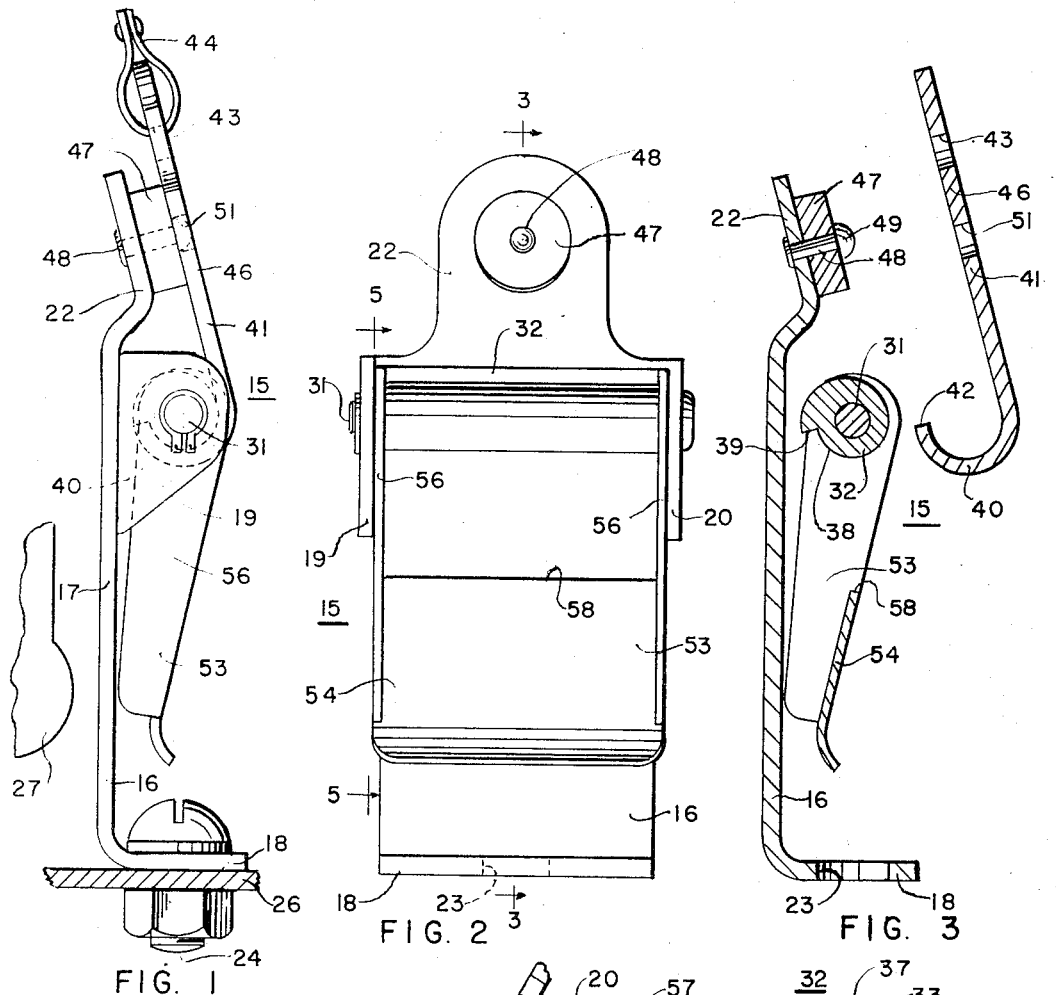
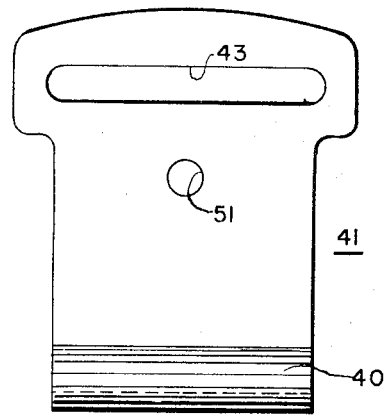
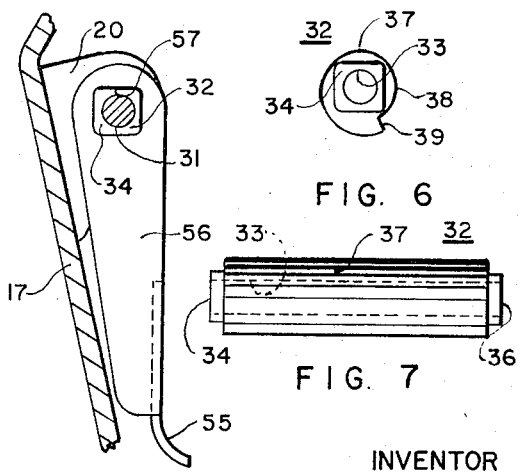
INVENTOR
RAYMOND L. SPRINGER
BY Pearce and Schaeperklaus
Attorneys Feb. 6, 1968  R. L. SPRINGER  3,366,996
SAFETY BELT-FASTENING DEVICES
Filed Sept. 24, 1965  2 Sheets-Sheet 2
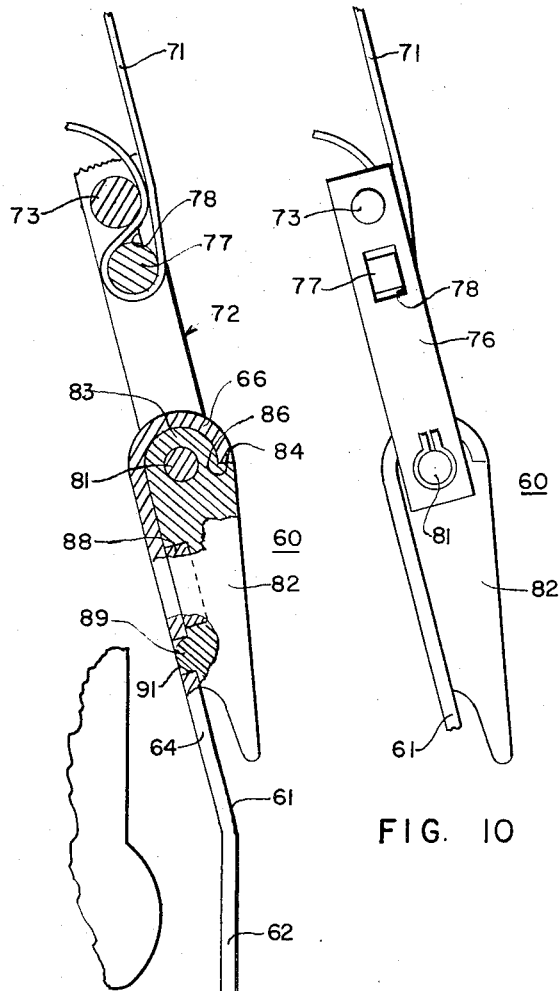
FIG. 9
FIG. 10
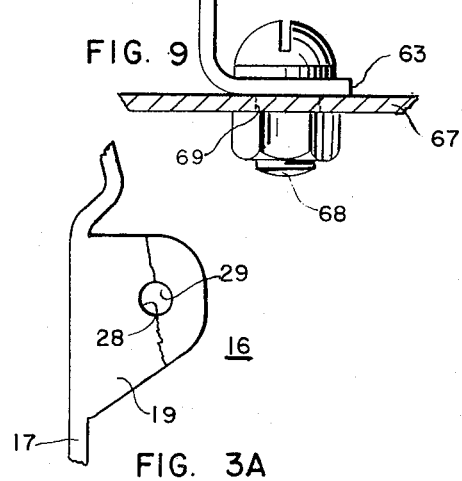
FIG. 3A
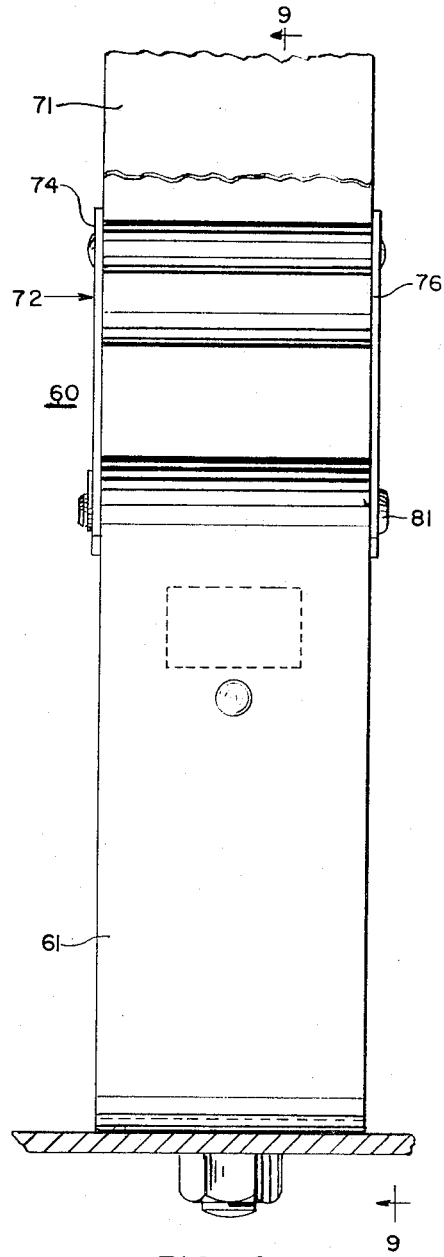
FIG. 8
INVENTOR
RAYMOND L. SPRINGER
BY Pearce & Schaeperklaus
Attorneys

United States Patent Office 3,366,996
Patented Feb. 6, 1968

3,366,996
SAFETY BELT-FASTENING DEVICES
Raymond L. Springer, Anderson Township, Hamilton County, Ohio, assignor to Kangol Helmets Limited, London, England
Filed Sept. 24, 1965, Ser. No. 489,976
10 Claims. (Cl. 24—68)

ABSTRACT OF THE DISCLOSURE

A belt fastening assembly which includes a member attached to a belt end and a member attached to a vehicle, one member having a hook, the other member having a crank provided with a portion engageable by the hook to connect the members, swinging of the crank causing engagement of a portion of the crank with the hook to cause release of the members from each other, a magnet normally holding the members against inadvertent release.

This invention relates to fastening devices. More particularly, this invention relates to fastenings or buckles for safety belts and harnesses and the like.

An object of this invention is to provide a safety belt fastening device having a stationary member which is attached to a floor or a frame element of a vehicle or the like and a moveable member which can be releasably attached to the stationary member, the moveable member being carried by a belt or the like.

A further object of this invention is to provide a fastening device in which one member includes a hook and the other member includes a hook-keeper engageable with the hook and in which a crank element can urge the hook off the hook-keeper to release the members, there being a magnet means for holding the members in engagement and preventing inadvertent movement of the crank element in releasing direction.

The above and other objects and features of this invention will be apparent to those skilled in the art to which this invention pertains from the following detailed description and the drawings, in which:

FIG. 1 is a view in side elevation of a belt fastening device constructed in accordance with an embodiment of this invention, a fragmentary portion of a vehicle floor and seat being shown in association therewith;

FIG. 2 is a view in front elevation of the belt fastening device illustrated in FIG. 1;

FIG. 3 is a view in section taken on the line 3—3 in FIG. 2; a hook member being displaced from a bracket thereof;

FIG. 3A is a fragmentary view in side elevation of a bracket which forms a portion of the device illustrated in FIGS. 1-3 inclusive;

FIG. 4 is a view in front elevation of the hook member of the device illustrated in FIGS. 1-3 inclusive;

FIG. 5 is a view in section taken on the line 5—5 in FIG. 2;

FIG. 6 is a view in end elevation of a crank sleeve member which forms a portion of the device;

FIG. 7 is a view in front elevation of the crank sleeve member illustrated in FIG. 6;

FIG. 8 is a view in front elevation of a belt fastening device constructed in accordance with another embodiment of this invention;

FIG. 9 is a view in section taken on the line 9—9 in FIG. 8; and

FIG. 10 is a fragmentary view in side elevation of the device illustrated in FIGS. 8 and 9.

In the following detailed description and the drawings, like reference characters indicate like parts.

In FIGS. 1 to 3, inclusive, is shown a belt fastening device 15 constructed in accordance with an embodiment of this invention. The device includes a bracket 16 which has an upright body 17, a lower horizontal flange 18, journal support flanges 19 and 20 (FIG. 2) and an upwardly projecting angled portion 22. The lower flange 18 is provided with a central opening 23 (FIG. 3) which receives a fastener 24 (FIG. 1) for attaching the bracket 16 to a floor panel 26 of a vehicle adjacent a seat 27 thereof with the body of the bracket extending upwardly adjacent the seat. The journal support flanges 19 and 20 are provided with transverse openings 28 and 29, respectively, (FIG. 3A), in which a journal pin 31 (FIG. 1) is received. On pin 31 is swingably mounted a crank sleeve 32. As shown in FIGS. 6 and 7, the crank sleeve 32 is provided with a central bore 33, which receives the pin 31, and square bosses 34 and 36 at opposite ends of a central portion 37 thereof. The central portion includes a cylindrical main section 38 and a crank projection or shoulder 39 (FIG. 6).

The main section 38 of the crank sleeve 32 is adapted to receive a hook portion 40 (FIG. 3) of a hook plate 41 with a free end 42 of the hook portion being engageable by the crank shoulder 39. The hook plate is provided with a transverse slot 43 which, as shown in FIG. 1, receives an end portion of a safety belt 44 and by means of which the hook plate is attached to the end portion of the safety belt with the hook portion or hook 40 extending outwardly therefrom. The other end portion of the belt 44 (not shown) can be attached to the vehicle floor or to another portion of the vehicle body at the side of the seat 27 remote from the portion shown and may include appropriate apparatus (not shown) for adjusting the length thereof. The hook plate 41 is formed of magnetically responsive material such as a high nickel steel or the like.

When the hook plate is in belt-fastening position, as shown in FIG. 1, with the hook portion 40 engaging the crank sleeve 32, a body portion 46 of the hook plate engages a permanent magnet 47, which is attached to the angled portion 22 of the bracket 16. The magnet 47 is attached to the angled portion 22 by a rivet 48 having a hemispherical head 49 (FIG. 3). The head 49 is received in a cylindrical bore 51 in the hook plate so that the hook plate is held against sliding transversely of the magnet when in belt-fastened position. The angled portion 22 is sloped in the direction of pull of the belt, and the hook plate is held by the magnet against inadvertent release. However, when the crank sleeve 32 is swung counterclockwise, as shown in FIGS. 1 and 3, the hook plate is forced off the crank sleeve and crosswise of the magnet so that, as the hook plate rides onto the hemispherical head 49 of the rivet 48, the magnetic connection between the magnet 47 and the hook plate 41 is broken, and the belt is released.

The crank sleeve 32 is swung by means of a crank operating handle 53 (FIGS. 1-3 inclusive) which includes a body 54 and flanges 56 (FIG. 3). As shown in FIG. 5, the flanges 56 are provided with square openings 57, only one of which is shown, which receive the bosses 34 and 36 of the crank sleeve 32 so that, when the handle 53 is swung, the crank sleeve 32 swings therewith. The body 54 of the handle 53 is cut away, as indicated at 58 in FIGS. 2 and 3, to permit passage of the hook portion 40 of the hook plate 41.

In FIGS. 8, 9 and 10, is shown a belt-fastening device 60 constructed in accordance with another embodiment of this invention. The belt-fastening device 60 includes a hook plate 61 having a body portion 62, a lower flange 63, a sloping portion 64, and a hook 66 at the upper end of the sloping portion 64. The hook plate 61 is attached to a floor panel 67 or the like of a vehicle by means of a fastener 68 which extends through an opening 69 in the floor panel.

An end portion of a safety belt 71 can be connected to the hook plate 61 by means of a fastening assembly 72. The assembly 72 includes a base pin 73 and side plates 74 and 76 (FIG. 8) attached thereto. A lock bar 77 (FIGS. 9 and 10) is mounted in slots 78, in the side plates and can engage and grip the belt 71 against the pin 73, as shown in FIG. 9. A pivot pin 81 spans the side plates 74 and 76 and pivotally supports a locking and release handle 82. As shown in FIG. 9, the handle includes a cylindrical portion 83, which is engageable by the hook 66 of the hook plate 61. The handle 82 also includes a crank shoulder 84 engageable with an end 85 of the hook so that, when the handle 82 is swung counterclockwise as shown in FIG. 9, the handle is disengaged from the hook plate to release the belt.

The handle 82 carries a permanent magnet 88, which is attached thereto by means of any suitable fastening means, not shown. When the handle is in belt-fastened position, as shown in FIG. 9, the magnet 88 engages the hook plate to hold the handle in belt-fastened position. A hemispherical lug 89 integral with the handle 82 fits in a cylindrical bore 91 in the hook plate 61 to hold the handle and the magnet against sliding crosswise of the hook plate.

The belt-fastening devices of this invention provide a positive lock which is held in closed or belt fastened position magnetically but which can readily be released when desired.

The fastener constructions illustrated in the drawings and described above are subject to structural modification without departing from the spirit and scope of the appended claims.

Having described my invention, what I claim as new and desire to secure by Letters Patent is:

1. A belt fastening device which comprises a stationary member, means for attaching the stationary member to a vehicle, a moveable member, and means for attaching the moveable member to the belt, one of said members including a hook, the other of said members including a crank element having a portion receiving said hook to hold the belt in belt-fastened position and a shoulder engageable with a free edge of the hook, means for swinging the crank element to cause the shoulder to engage the hook and release the crank element from the hook, magnetic means interconnecting the members and resisting swinging of the crank element when the hook is in belt-fastened position, and means interconnecting the members to hold the members against movement transversely of the magnetic means when the hook is in belt-fastened position, the interconnecting means being released when the crank element is swung to release the crank element from the hook.

2. A belt fastening device which comprises a stationary member, means for attaching the stationary member to a vehicle, a moveable member, and means for attaching the moveable member to the belt, one of said members including a hook plate having a hook at one end thereof, the other of said members including a crank element having a portion receiving said hook to hold the belt in belt-fastened position and a shoulder engageable with a free edge of the hook, means for swinging the crank element to cause the shoulder to engage the hook and release the crank member from the hook, magnetic means interconnecting the members and resisting swinging of the crank element when the hook is in belt-fastened position, there being a slot in the hook plate, and a lug on the other member received in said slot when the members are in belt-fastened position to hold the members against movement transversely of the magnetic means when in belt-fastened position, the lug being released from the slot when the crank element is swung to release the crank element from the hook.

3. A belt fastening device which comprises a stationary member, means for attaching the stationary member to a vehicle, a moveable member, and means for attaching the moveable member to the belt, one of said members including a hook plate having a hook at one end thereof, the other of said members including a crank element having a portion receiving said hook to hold the belt in belt-fastened position and a shoulder engageable with a free edge of the hook, means for swinging the crank element to cause the shoulder to engage the hook and release the crank member from the hook, magnetic means interconnecting the members and resisting swinging of the crank element when the hook is in belt-fastened position, there being a cylindrical slot in the hook plate, and a hemispherical lug on the other member received in said slot when the members are in belt-fastened position to hold the members against movement transversely of the magnetic means when in belt-fastened position, the lug being released from the slot when the crank element is swung to release the crank element from the hook.

4. A belt-fastening assembly which comprises a hook member including a body and a hook at one end of the body, means for attaching the body of the hook member to a belt with the hook extending outwardly therefrom, a bracket, means for attaching the bracket to a vehicle adjacent a seat, a crank member, means on the bracket for pivotally supporting the crank member, the crank member including a body for receiving the hook and a crank shoulder engageable with an end of the hook, means for swinging the crank member to cause the shoulder to engage the hook and urge the hook from the body of the crank member, a permanent magnet, means for mounting the magnet on the bracket adjacent the crank, the hook member engaging the magnet and being held in engagement therewith when the hook is in engagement with the body of the crank member, and a lug substantially centrally of the magnet, there being a slot in the body of the hook member receiving the lug to prevent movement of the body of the hook member transversely of the magnet when the hook is in engagement with the body of the crank member.

5. A belt-fastening assembly which comprises a hook member including a body and a hook at one end of the body, means for attaching the body of the hook member to a belt with the hook extending outwardly therefrom, a bracket, means for attaching the bracket to a vehicle adjacent a seat, a crank member, means on the bracket for pivotally supporting the crank member, the crank member including a body for receiving the hook and a crank shoulder engageable with an end of the hook, means for swinging the crank member to cause the shoulder to engage the hook and urge the hook from the body of the crank member, a permanent magnet and means for mounting the magnet on the bracket adjacent the crank, the hook member engaging the magnet and being held in engagement therewith when the hook is in engagement with the body of the crank member.

6. A belt-fastening assembly which comprises a hook member including a body and a hook at one end of the body, means for attaching the body of the hook member to a belt with the hook extending outwardly therefrom, a bracket, means for attaching the bracket to a vehicle adjacent a seat, a crank member, means on the bracket for pivotally supporting the crank member, the crank member including a body for receiving the hook and a crank shoulder engageable with an end of the hook, means for swinging the crank member to cause the shoulder to engage the hook and urge the hook from the body of the crank member, a permanent magnet, means for mounting the magnet on the bracket adjacent the crank, the hook member engaging the magnet and being held in engagement therewith when the hook is in engagement with the body of the crank member, and a hemispherical boss substantially centrally of the magnet, there being a cylindrical slot in the body of the hook member receiving the boss to prevent movement of the body of the hook member transversely of the magnet when the hook is in engagement with the body of the crank member.

7. A device for fastening a belt which comprises a stationary hook member, the hook member comprising a body, means on the body for attaching the hook member to a vehicle adjacent a seat and a hook on the body, a moveable member, the moveable member including a frame, means for attaching the frame to the belt, a crank member pivotally mounted on the frame, the crank member including a main portion engageable by the hook and a crank shoulder engageable with an edge of the hook, handle means for swinging the crank member to cause the crank shoulder to engage the end of the hook and force the crank member from the hook to release the crank member, a magnet mounted on the handle means and engageable with the body of the hook member to hold the handle means and the crank member against swinging in belt releasing direction, and a boss on the handle means adjacent the magnet, there being a slot in the body of the hook member in which the boss is received to prevent movement of the handle and the magnet transversely of the body of the hook member when the magnet is in engagement with the body of the hook member.

8. A device for fastening a belt which comprises a stationary hook member, the hook member comprising a body, means on the body for attaching the hook member to a vehicle adjacent a seat and a hook on the body, a moveable member, the moveable member including a frame, means for attaching the frame to the belt, a crank member pivotally mounted on the frame, the crank member including a main portion engageable by the hook and a crank shoulder engageable with an edge of the hook, handle means for swinging the crank member to cause the crank shoulder to engage the end of the hook and force the crank member from the hook to release the crank member, and a magnet mounted on the handle means and engageable with the body of the hook member to hold the handle means and the crank member against swinging in belt releasing direction.

9. A device for fastening a belt which comprises a stationary hook member, the hook member comprising a body, means on the body for attaching the hook member to a vehicle adjacent a seat and a hook on the body, a moveable member, the moveable member including a frame, means for attaching the frame to the belt, a crank member pivotally mounted on the frame, the crank member including a main portion engageable by the hook and a crank shoulder engageable with an edge of the hook, a handle for swinging the crank member to cause the crank shoulder to engage the end of the hook and force the crank member from the hook to release the crank member, and magnet means for interconnecting the handle and the body of the hook member to hold the handle and the crank member against swinging in belt releasing direction.

10. A belt-fastening assembly which comprises a hook member including a body and a hook at one end of the body, means for attaching the body of the hook member to a belt with the hook extending outwardly therefrom, a bracket, means for attaching the bracket to a vehicle adjacent a seat, a crank member, means on the bracket for pivotally supporting the crank member, the crank member including a body for receiving the hook and a crank shoulder engageable with an end of the hook, means for swinging the crank member to cause the shoulder to engage the hook and urge the hook from the body of the crank member, a permanent magnet, means for mounting the magnet on the bracket adjacent the crank, the hook member engaging the magnet and being held in engagement therewith when the hook is in engagement with the body of the crank member, and a lug adjacent the magnet, there being a slot in the body of the hook member receiving the lug to prevent movement of the body of the hook member transversely of the magnet when the hook is in engagement with the body of the crank member.

References Cited

UNITED STATES PATENTS

| 1,568,014 | 12/1952 | Watson | 248—361 |
| 2,280,694 | 4/1942 | Embree et al. | 248—361 |
| 2,539,997 | 1/1951 | Graves | 248—361 |
| 3,127,650 | 4/1964 | Seward | 24—68 |

FOREIGN PATENTS

| 1,187,838 | 2/1965 | Germany. |
| 391,350 | 8/1965 | Switzerland. |

DONALD A. GRIFFIN, *Primary Examiner.*